US008913827B1

(12) United States Patent
Fang

(10) Patent No.: US 8,913,827 B1
(45) Date of Patent: Dec. 16, 2014

(54) IMAGE COLOR CORRECTION WITH MACHINE LEARNING

(75) Inventor: Hui Fang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 759 days.

(21) Appl. No.: 13/104,625

(22) Filed: May 10, 2011

Related U.S. Application Data

(60) Provisional application No. 61/333,196, filed on May 10, 2010.

(51) Int. Cl.
G06K 9/00 (2006.01)

(52) U.S. Cl.
USPC .......................................... 382/167; 382/162

(58) Field of Classification Search
None
See application file for complete search history.

(56) References Cited

PUBLICATIONS

Chang et al "Example Based Color Transformation of Image and Video Using basic Color Categories" IEEE transactions on Image Processing Feb. 2007.*
Tai et al Local Color transfer via probabilistic segmentation by Expectation-Maximization Computer Vision and Pattern Recognition, 2005. CVPR 2005. IEEE Computer Society Conference on.*
Chang et al., "Example-Based Color Transformation for Image and Video", 2005, pp. 347-353.
Freund et al., "A Decision-Theoretic Generalization of On-Line Learning and an Application to Boosting", Journal of Computer and System Sciences 55, 119-139, 1997.
Gagalowicz et al., "Computer Vision/ Computer Graphics Collaboration Techniques", Third International Conference, Mirage 2007, Mar. 28-30, 2007 (reference is provided in four parts as it is too large to submit in one file.).
Hasler et al., "Measuring colourfulness in natural images", In Proc. IST/SPIE Electronic Imaging 2003: Human Vision and Electronic Imaging VIII, vol. 5007, 2003.
Lazebnik et al., "Beyond Bags of Features: Spatial Pyramid Matching for Recognizing Natural Scene Categories", Proceeding of the 2006 IEEE Computer Society Conference on Computer Vision and Pattern Recognition, 2006.
Leordeanu et al., "A Spectral Technique for Correspondence Problems Using Pairwise Constraints", In ICCV '05: Proceedings of the Tenth IEEE International Conference on Computer Vision, IEEE Computer Society, 2005.
Perez et al., "Poisson Image Editing", 2003, 22, 3, pp. 313-318.
Reinhard, et al., "Color Transfer between Images", IEEE Computer Graphics and Applications, vol. 21, Issue 5, Sep./Oct. 2001, pp. 2-9.
Tai et al., "Local Color Transfer via Probabilistic Segmentation by Expectation-Maximization", Published in Computer Vision and Pattern Recognition, 2005. CVPR 2005. IEEE Computer Society Conference on (vol. 1 ), 8 pages.
Xiang et al., "Multi-Source Color Transfer for Natural Images", 2008, pp. 469-472.

* cited by examiner

Primary Examiner — Sean Motsinger
(74) Attorney, Agent, or Firm — Lerner, David, Littenberg, Krumholz & Mentlik, LLP

(57) ABSTRACT

Systems, methods and computer program products for image color correction are described herein. An embodiment includes identifying color candidates of mean color correspondences between a first image having desired color characteristics and a second image to which the desired color characteristics are to be applied, training a classifier to provide a metric that corresponds a degree of difference between the first image and the second image, and iteratively determining mean color correspondences between the first image and the second image using the metric as an objective function and generating a color-corrected image having the desired color characteristics of the first image using the determined mean color correspondences.

21 Claims, 12 Drawing Sheets
(7 of 12 Drawing Sheet(s) Filed in Color)

IMAGE COLOR CORRECTION WITH MACHINE LEARNING

CROSS-REFERENCE TO RELATED APPLICATION

This patent application claims the benefit of U.S. Provisional Patent Application No. 61/333,196, filed May 10, 2010, entitled "Image Color Correction with Machine Learning," which is incorporated herein by reference in its entirety.

BACKGROUND

1. Field

Embodiments generally relate to image processing, and particularly to color correction.

2. Background Discussion

Digital image editing can include color transfer scenarios, where a user wants to impart color characteristics of one image to another image. In one example application, users may want to merge partially overlapping satellite imagery from different providers to generate a large digital map. Images included in this imagery may have different exposure and color balance values. For example, the images may have been taken at different times of a day. Furthermore, real world objects in the images may have changed due to changing seasons or even human construction. Without proper preprocessing, merging imagery from multiple sources may lead to a 'patchy' result, where images have different and/or inconsistent color characteristics.

In another example application, users may want to enhance user captured digital images by looking at examples of other images. Given images capturing a similar scene, a user may want to process an image captured by the user so that the image appears as a professionally captured and a more aesthetically pleasing image. Such processing can be significantly harder than the previous exemplary application because it does not have the benefit of spatially overlapping information, which can serve as an important heuristic on how to correspond colors between two different images.

Transferring colors from one image to another can be a challenging task. This is partly because a metric that can measure the likeliness of a "color mood" in an image, while tolerating image variations, is difficult to define explicitly.

A very simple approach to accomplish color transfer is to match an average color and its standard deviation of two images. This approach works well when two images contain similar portions or proportions of colors. However, limitations of this approach become evident when the proportions of color between the images are varied. For example, there may be two images, each of the ocean and a beach, where one image's colors are to be used to enhance the other image's colors. A first image may contain a 70% ocean region and a 30% beach region, while a second image may contain a 30% ocean region and a 70% beach region. Using the conventional approach just described, matching the colors would yield a new image on which the average color shifts the blue color of the ocean in the first image into an undesirable yellow-ish blue color because of the varying color proportions between the images. Equalizing an image color histogram also leads to similar artifacts.

Other approaches break either the images or the color space into segments for refined color matching. In the above example, a more sophisticated algorithm would match the blue color of the ocean and the yellow color of the beach separately, and thus attempt to avoid substantial shifting of the blue color of the ocean to yellow or vice-versa. However, when dealing with images with more than two distinguishable colors, matching colors for color transfer becomes even more challenging. Such matching has usually been done in a greedy way, where colors closest to each other under some metric are paired together. This often leads to limited options and less satisfying results. Although color pair search can be expanded by considering multiple matching candidates for each color, it is not always possible to tell which combination of color pairing is better. A metric on how well colors of images match remains elusive.

BRIEF SUMMARY

Embodiments relate to image color correction with machine learning. An embodiment includes identifying color candidates of mean color correspondences between a first image having desired color characteristics and a second image to which the desired color characteristics are to be applied, training a classifier to provide a metric that corresponds to a degree of difference between the first image and the second image, and iteratively determining optimal mean color correspondences between the first image and the second image using the metric as an objective function.

The embodiment further includes recursively re-training the classifier to obtain updated metrics that correspond to a degree of difference between the first image and one or more color-corrected candidates of the second image, and selecting a candidate image having the desired color characteristics after a pre-determined number of re-training recursions, the candidate image corresponding to a desired metric score.

Embodiments also include generating a transformation field in color space to transform one or more mean colors in the second image and generating a color-corrected image having the desired color characteristics of the first image using the transformed colors.

Further embodiments, features, and advantages of the embodiments, as well as the structure and operation of the various embodiments are described in detail below with reference to accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the embodiments are described here with reference to illustrative applications, it should be understood that the embodiments are not limited thereto. Those skilled in the art with access to the teachings provided here will recognize additional modifications, applications, and embodiments within the scope of the teachings and additional fields in which the present embodiments would be of significant utility.

According to an example embodiment, color candidates of mean color correspondences between a first image having desired color characteristics and a second image to which the desired color characteristics are to be applied may be identified. A classifier may be trained to provide a metric that corresponds to a degree of difference between the first image and the second image. Optimal mean color correspondences may be iteratively determined between the first image and the second image using the metric as an objective function.

According to an example embodiment, a color candidate identifier identifies color candidates of mean color correspondences between a first image having desired color characteristics and a correctible image to which the desired color characteristics are to be applied. A classifier provides a metric that corresponds a degree of difference between the first image and the second image. An optimizer iteratively determines optimal mean color correspondences between the first image and the second image using the metric as an objective function, and a color transfer module generates a transformation field in color space to transform one or more mean colors in the second image and generate a color-corrected image having the desired color characteristics of the first image using the transformed colors.

Figure 1A:
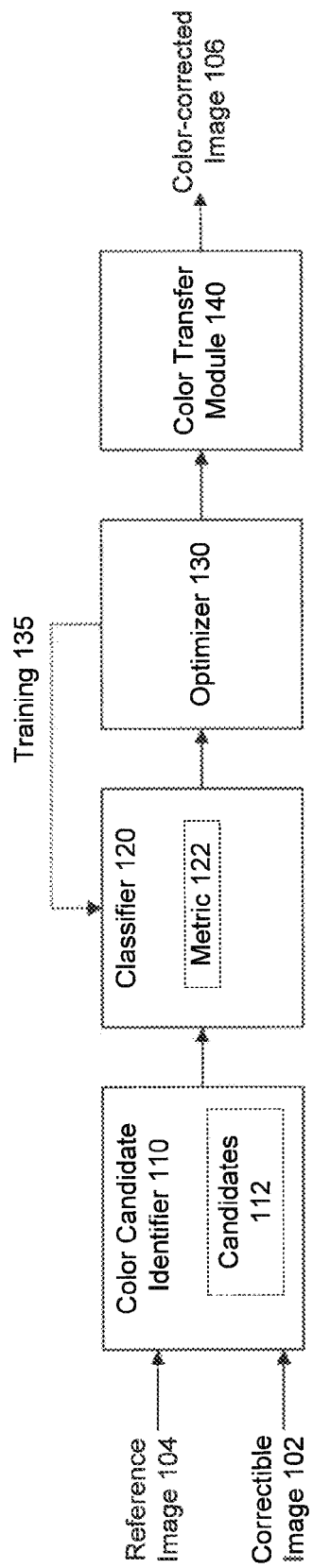
FIG. 1A illustrates components for performing image color correction with machine learning, according to an embodiment.

FIG. 1A illustrates components for performing image color correction with machine learning, according to an example embodiment. The components of FIG. 1A may be used to enhance the colors of a second image based on the colors occurring in a first image. The first image may include a reference image 104 that includes one or more similar objects for which the colors and/or attributes or characteristics of the colors are more desirable to a user. The second image may include a correctible image 102 of one or more objects, in which the colors and/or attributes or characteristics of the colors (e.g., brightness, intensity, hue, etc.) are less than desirable to the user. The components may then enhance the colors and/or attributes or characteristics of the colors of the correctible image 102 based on reference image 104. The components then produce color-corrected image 106 that includes the objects as appearing in correctible image 102 with one or more colors corrected based on reference image 104. It should be understood that operations of 'correcting the color' of the correctible image, 'correcting the color' or 'enhancing the color' are used interchangeably and refer to correcting, changing, enhancing or otherwise modifying the color(s) and/or attributes or characteristics of the colors of correctible image 102.

In an embodiment, color candidate identifier 110 identifies colors from objects (or portions) of reference image 104 that correspond to color correctible objects (or portions) of correctible image 102. The components illustrated in FIG. 1A, may not only determine which colors of correctible image 102 to enhance, but also which combinations of colors will appear most appropriate in the resulting color-corrected image 106.

Color candidate identifier 110 receives correctible image 102 and reference image 104, and determines color candidates 112 from each image. Color candidates 112 may include one or more colors as identified from each image that correspond to each other. For example, candidate identifier 110 may determine one or more correctible colors from correctible image 102, and then for each correctible color, may determine one or more corresponding candidate colors from reference image 104. Color candidates 112 may then include the correctible colors and the candidate colors as determined by color candidate identifier 110.

In an embodiment, color candidate identifier 110 is configured to identify color candidates of mean color correspondences between reference image 104 having desired color characteristics and correctible image 102 to which the desired color characteristics are to be applied. According to an example embodiment, color candidate identifier 110 may use or apply a standard k-means algorithm or clustering to find mean colors from each image. The k-means algorithm is an unsupervised learning algorithm known to those skilled in the art. For each mean color in correctible image 102, color candidate identifier 110 may find multiple mean or candidate colors in reference image 104 as possible colors to match to those mean colors from correctible image 102. It is to be appreciated that the embodiments are not limited to mean color values and the k-means algorithm and can be applied to any other color values or functions of the embodiments.

Color candidate identifier 110, using a second-order spectral correspondence operation, may define or determine an affinity matrix to find multiple mean colors in reference image 104 as possible colors to match to those in correctible image 102. Spectral correspondence operations are known to those skilled in the art and may be used to find correspondences between two sets of features given an adjacency or affinity matrix of their pairwise agreements. A second order spectral correspondence technique, according to an embodiment, label is discussed below with respect to affinity matrix M.

Color candidate identifier 110 may pick n mean colors for both images, $\{c_p\}$ from reference image 104 and $\{c_u\}$ from correctible image 102. A candidate (e.g., candidate color 112) $a=(i, i')$ matches $c_{pi}$ to $c_{ui'}$.

The affinity matrix M may be $n^2$ by $n^2$ where:
1. $M(a, a)=1.0-\|a\|$, measures how well $c_{pi}$ matches $c_{ui'}$, where $\|a\|$, is normalized color distance between $c_{pi}$ and $c_{ui'}$.
2.

$$M(a, b) = \frac{1}{n}$$

Consist $(a, b) \times$ Neighboring$(a, b)$, measures how well two matches agree with other. Here $a=(i, i')$ and $b=(j, j')$.

The consistency term in M(a, b) captures the difference between $dif_p = c_{pi} - c_{pj}$ and $dif_u = c_{ui'} - c_{uj'}$. Intuitively, if $c_{pi}$ is brighter than $c_{pj}$ in a color channel, but $c_{ui'}$ is darker than $c_{uj'}$, the consistency score may be low because matching these two pairs of colors will invert contrast in the image.

For example, $$\text{Consist}(a,b) = \text{Match}(a,b) \times \text{Range}(a,b) \times \text{coef} \quad (1)$$

where $$\text{Match}(a, b) = \frac{1}{2}\left(\frac{dif_p}{\|dif_p\|} \cdot \frac{dif_u}{\|dif_u\|} + 1\right) \quad (2)$$

Match (a,b) is a non-negative value on consistency of direction between two matches, $$\text{Range}(a, b) = \begin{cases} \frac{dif_u}{dif_p}, & \|dif_p\| \geq \|dif_u\| \\ \frac{dif_p}{dif_u}, & \|dif_p\| < \|dif_u\| \end{cases} \quad (3)$$

Range (a,b) penalizes different magnitudes of two matches.

$$\text{coef} = 1 - \frac{\|dif_u\|}{\text{MaxDif}} \quad (4)$$

The coefficient "coef" penalizes on a larger difference between two undesirable colors, because their correlation becomes less relevant. Furthermore, the value of coef floors at zero. In an embodiment, MaxDif=100×√3 may, for example, be used for 8-bit colors with 3 channels.

In an embodiment, Neighboring (a, b) may measure neighboring information between colors. Intuitively, if two preferred colors neighbor each other substantially in reference image 104, they are preferred to color neighboring segments in correctible image 102 too, and vice-versa. Embodiments define $n_{ij}$ as ratio of pixels from $c_{pi}$ among all pixels neighboring $c_{pj}$ in the image.

$$\text{Neighboring}(a, b) = 1 - \frac{1}{2}(\|n i_j - n_{i'j'}\| + \|n_{ji} - n_{j'i'}\|) \quad (5)$$

In an embodiment, 1/n in M(a, b) is a normalization term such that for each column of M, the sum of M(a, b) is comparable to that of M(a, a).

In an embodiment, the principal eigenvector of M ranks all possible color pair candidates 112 by likelihood. Eigenvectors are known to those skilled in the art. For example, eigenvectors of a square matrix may be non-zero vectors that, after being multiplied by the matrix, remain proportional to the original vector. According to an example embodiment, color candidate identifier 110 may pick a top percentage (e.g., top 40%) of candidates while retaining a few candidates (e.g., three candidates) for each $c_u$ from correctible image 102. In other example embodiments, the percentage and/or number of candidates, as selected by color candidate identifier 110, may vary.

In an embodiment, the second-order term M(a, b), plays a regularization role in robust color pair matching as may be performed by color candidate identifier 110. Without M(a, b), for example, color candidate identifier 110 may degenerate to a greedy approach of simply matching closest colors. The affinity matrix M discussed above, may have a size of $n^4$. According to an example embodiment, color candidate identifier 110 may make the affinity matrix sparse by selectively considering color pairs suitable as candidates 112. According to an example embodiment, color candidate identifier 110 imposes a restriction on color pairs with varying attributes (e.g., restrictions such as hue difference <45 and hsv color difference <100). Color candidate identifier 110, outputs a mean color count (for candidates 112) that is sufficient for color transfer purposes. As a purely illustrative non-limiting example, thirty or less mean colors may be sufficient in an example embodiment.

Classifier 120 may determine or provide metric 122 that indicates a degree of difference between correctible image 102 and reference image 104. It may be that multiple candidates of preferred colors from reference image 104 for each undesirable or correctible color from correctible image 102 may lead to numerous combinations, each of which generates a possible color transfer result. Thus, metric 122 may indicate a level of difference between colors of an image (e.g., an enhanced or corrected image or version of correctible image 102) and the colors of reference image 104. Classifier 120 may then use metric 122 to pick the best color combination.

According to an example embodiment, simple features like average color or global color histogram are sensitive to area ratios of different colors in images, and may be less useful for the purpose of determining metric 122. As a result, because it may be difficult to define such a vague metric 122 explicitly, classifier 120, according to an example embodiment, may utilize a machine learning algorithm such as AdaBoost to learn metric 122 from images.

As just referenced, classifier 120 may include a machine learning classifier, such that classifier 120 can, for example, return a higher score on a feature of an image whose color characteristics are less different from the color characteristics of reference image 104. Classifier 120 may return a low score for correctible image 102 (before it has been color corrected or enhanced), but a high score once correctible image 102 is modified or corrected to (better) match the colors of reference image 104.

As referenced above, according to an example embodiment, classifier 120 need not be based on the spatial layout of reference image 104 because the spatial layout between reference image 104 and correctible image 102 may vary and may, for example, produce less than desirable color corrected image 106. Instead, in an embodiment, classifier 120 uses a feature based on a spatial pyramid matching kernel (SPMK) of LAB color. SPMK of LAB color is a feature that is known to those skilled in the art. A LAB color space, for example, is a color-opponent space with dimension L for lightness, and A and B for the color-opponent dimensions.

In an embodiment, to avoid a dependency on image composition in classifier 120, in a training stage both images (i.e., reference image 104 and correctable image 102) are resolved or sub-divided into a virtual pyramid of overlapping patches. In a non-limiting embodiment, the images are decomposed into image patches (e.g., 1 by 1, 2 by 2, . . . , 10 by 10 pixel patches), with an overlapping (e.g., 20% overlapping) between patches. Each patch may be further down-sampled (e.g., down sampled to 50 by 50 pixels), by classifier 120, if necessary, for fast feature finding.

In an embodiment, patches from reference image 104 are labeled positive, and those from correctible image 102 are labeled negative, accompanied by their respective SPMK features. Other example embodiments may include variations in the implementation of classifier 120 as just specified, for example, a varying number of patches, pixel values or percentages may be used. The specific examples provided here are intended to be exemplary and not limiting to the example embodiments of the components of FIG. 1A.

In an example embodiment, a standard AdaBoost training may be performed on features in the image patches to yield classifier 120 with a plurality of decision stumps (e.g., 300 decision stumps). AdaBoost is a machine learning algorithm that is well known to persons skilled in the art. During optimization, optimizer 130 may find features on image patches of a color-transferred correctible image in a similar way, and apply classifier 120 on each of the images. Classifier 120 may use the average score or metric 122 for the images to which classifier 120 has been applied. AdaBoost thresholds may be scored to return a binary decision, or classifier 120 may use the score or metric 122 directly as an optimization objective function for optimizer 130.

Optimizer 130 determines which color combinations to use for enhancing correctible image 102 based on reference image 104. As combinations of multiple preferred colors (from reference image 104) for each correctible color (from correctible image 102) may be exponential for a brute force search, optimizer 130 may iteratively parse through and score the combinations to determine the best color combinations by which to enhance or correct correctible image 102 colors. According to an example embodiment, optimizer 130 begins by selecting a first candidate match for each correctible color. At each iteration, optimizer 130 may try the correctible colors one by one, loop through its candidates, and pick a candidate color match yielding the best or highest scoring metric 122. It maybe, for example, be the case that optimizer 130 iterates through candidates 112 multiple times before determining the optimal color matches.

As referenced above, components of FIG. 1A may accomplish image color correction using machine learning or training 135. Training 135 may include a recursive and/or iterative training as taking place between classifier 120 and optimizer 130. For example, in referring to the color transferred image from optimizer 130 as $I_0$, if $I_0$ has not yet matched reference image 104's colors, $I_0$'s color scheme may lie between the color scheme of preferred or reference image 104 $I_p$ and the un-preferred or correctible image 102 $I_u$.

According to an example embodiment, classifier 120 may have been initially trained using $I_p$ and $I_u$. As such, classifier 120 may not have been fine-tuned to determine the smaller difference(s) between $I_0$ and $I_p$, and thus may not be able to further improve the results of optimizer 130. To remedy this, in an embodiment, training 135 may repeat optimization (and other operations) using image patches from both $I_u$ and $I_0$ as negative examples to obtain another color-corrected image $I_1$. In this way, classifier 120 may utilize and account for more subtle differences between $I_0$ and $I_p$, so color-corrected image $I_1$ is likely a better color correction result.

Training 135 may cause classifier 120 to perform refinement recursively, where each recursive iteration uses correctible image 102 and all previously generated color transferred or color-corrected images as negative examples. According to an example embodiment, recursion may be performed a fixed or variable number of times to prevent quality oscillation during this recursive approach. Quality oscillation refers to a situation in which, assuming image $I_k$ is actually the optimal color-corrected result, oscillation in color-corrected image quality occurs above a certain number of recursions in which the quality of further color-corrected image $I_{k+1}$ starts to get worse. According to an example embodiment, classifier 120 completes a fixed number of recursions with a collection of images $\{I_k\}$, and trains another classifier 120 with images $\{I_k\}$ as negative examples against image $I_p$. An image a with highest score among images $\{I_k\}$ may then be picked as an output color transfer result.

While classifier 120 trained on multiple patches may have good tolerance to content variations, metric 122 may, for example, not favor images matching the entirety of a preferred image over those matching a part. In an extreme non-limiting example, if the entire correctible image 102 is colored blue, it may match the sky part in reference image 104 perfectly, and thus have a high score for metric 122. Thus, in an example embodiment, optimizer 120 may apply regularization on the variations it attempts. For example, such regularization may be obtained by setting a limit on hue variations of matching candidates.

Color transfer module 140 transfers colors from reference image 104 to correctible image 102. Color transfer module 140 may, for example, receive a matched color pair from optimizer 130, where the matched color pair may include a correctible color from correctible image 102 and a matched corresponding preferred or reference color from reference image 104. Color transfer module 140 may then enhance the correctible color based on the preferred or reference color by replacing the correctible color with the reference color and/or blending the two colors to produce color-corrected image 106.

According to an example embodiment, once matching pairs of mean colors in reference image 104 and correctible image 102 are found, they are used to generate a transformation field in color-space. Given mean colors $\{c_p\}$ in reference image 104 and mean colors $\{c_u\}$ in correctible image 102, their correspondence, $\{(c_{pi}, c_{ui})\}$, has been discussed above.

For each pixel in correctible image 102 with color c, its color transformation may be defined as, $$c_{new} = c + k \sum \frac{c_{pi} - c_{ui}}{\omega_i} \quad (6)$$

where, $$\omega_i = \frac{1}{\|c_{ui} - c\|^2}, k = \frac{1}{\sum \omega_i} \quad (7)$$

When two correctible mean colors that are close to each other are matched to two preferred or reference colors that are far apart in color space, it may lead to artificial noise between areas with two colors in color-corrected image 106. As referenced above, a regularization operation as performed by classifier 120 may correct for such noise. Classifier 120 may detect a situation that may cause artificial noise by measuring color distance between each pair of $(c_{pi}, c_{ui})$ and $(c_{pj}, c_{uj})$.

In a non-limiting embodiment, if $\|c_{pi}-c_{pj}\|>=k\|c_{ui}-c_{uj}\|$, where k may, for example, equal 3, color transfer module 140 may selectively abandon either $(c_{pi}, c_{uj})$ or $(c_{pj}, c_{uj})$. To pick which color pair to abandon, color transfer module 140 may find for each match in $\{(c_{pi}, c_{ui})\}$ the classifier score difference on the color-transferred image with and without $(c_{pi}, c_{ui})$, and abandon the color pair that leads to a lesser classifier score drop. In this way, classifier 120 corrects for artificial noise that may be generated in color-corrected image 106.

In an example embodiment, artifacts may occur at some locations in color-corrected image 106 where features are unnaturally enhanced or removed due to specific color combinations. In such situations, instead of outputting color-corrected image 106 in its entirety, the transferred color may be applied at sparse pixel locations on correctible image 102 (or a copy of correctible image 102), to preserve color gradients and details occurring in correctible image 102. New colors may then be propagated to the rest of the image 106 using, for example, Poisson image editing. Poisson image editing is known to those skilled in the art. Poisson image editing may be used to fix details, for example, by adding a back gradient from the original correctible image 102 in or to color-corrected image 106.

The components of FIG. 1A may be used in any number of varying applications. For example, the components may be used to color correct satellite images (obtained from one or more satellite imaging sources) against each other, and color correct building facade textures under different lighting angles so that they appear consistent. Artificial shading may also be applied to building textures. In other example applications, the components may be used in other forms of image processing and editing applications to color correct images against each other. Though the components of FIG. 1A have been described in reference to a single correctible image 102 and a single reference image 104, one skilled in the art will recognize that the components may be used to perform color correction on multiple reference images 104 and/or multiple correctible images 102.

Figure 1B:
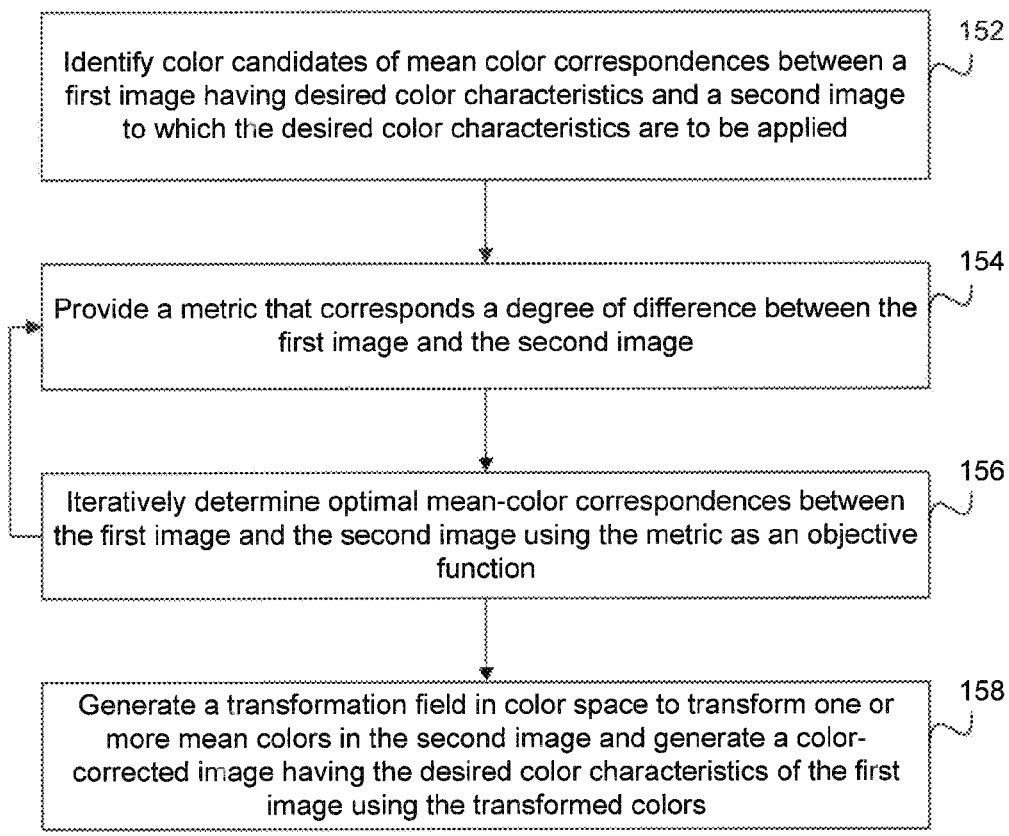
FIG. 1B is a flowchart illustrating an exemplary overall operation for performing image color correction with machine learning, according to an example embodiment.

FIG. 1B is a flowchart illustrating an operation 150, which is an exemplary overall operation of the components of FIG. 1A.

Operation 150 begins with identifying color candidates of mean color correspondences between a first image having desired color characteristics and a second image to which the desired color characteristics are to be applied (stage 152). Such identifying may be performed for example, by color candidate identifier 110. A metric that corresponds to a degree of difference between the first image and the second image is then provided (stage 154). The metric may be, for example, provided by classifier 120. Optimal mean color correspondences between the first image and the second image using the metric as an objective function are iteratively determined (stage 156). As an example, optimizer 130 may determine optimal mean color correspondences between the first image and the second image. Then, a generate a transformation field is generated in color space to transform one or more mean colors in the second image and generate a color-corrected image having the desired color characteristics of the first image using the transformed colors (stage 158). As an example, color transfer module 140 may generate a transformation field.

Figure 1C:
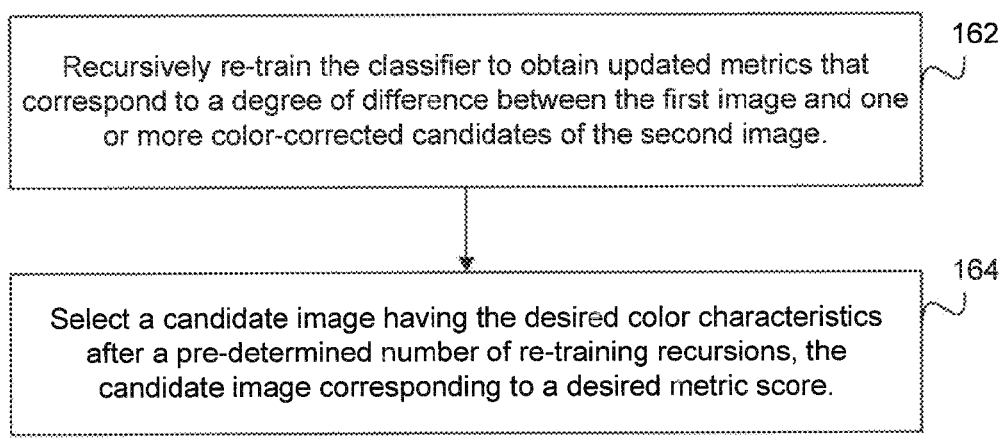
FIG. 1C is a flowchart illustrating an exemplary overall operation of an optimizer, according to an embodiment.

FIG. 1C is a flowchart illustrating an operation 160, which is an exemplary overall operation of optimizer 130.

Operation 160 begins with recursively re-training a classifier to obtain updated metrics that correspond to a degree of difference between the first image and one or more color-corrected candidates of the second image (stage 162). As an example optimizer 130 recursively re-trains classifier 120 to obtain updated metrics that correspond to a degree of difference between the first image and one or more color-corrected candidates of the second image. Then, a candidate image having the desired color characteristics is selected after a pre-determined number of re-training recursions, where the candidate image corresponds to a desired metric score (stage 164). As an example, optimizer 130 selects a candidate image having the desired color characteristics after a pre-determined number of re-training recursions, the candidate image corresponding to a desired metric score.

Figure 1D:
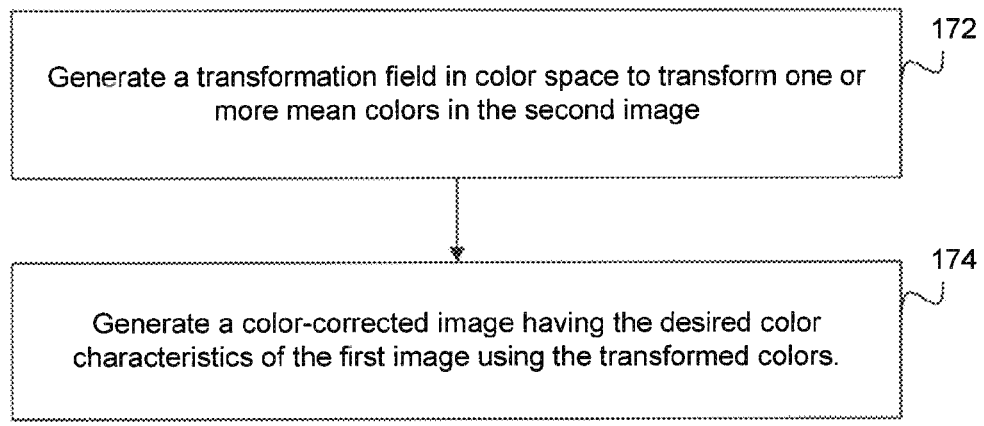
FIG. 1D is a flowchart illustrating an exemplary overall operation of a color transfer module, according to an embodiment.

FIG. 1D is a flowchart illustrating an operation 170, which is an exemplary overall operation of color transfer module 140 as described above.

Operation 170 begins with generating a transformation field in color space to transform one or more mean colors in the second image (stage 172). As an example, color transfer module 140 generates a transformation field in color space to transform one or more mean colors in the second image. Then, a color-corrected image having the desired color characteristics of the first image is generated using the transformed colors (stage 174). As an example, color transfer module 140 generates a color-corrected image having the desired color characteristics of the first image using the transformed colors.

Figure 2:
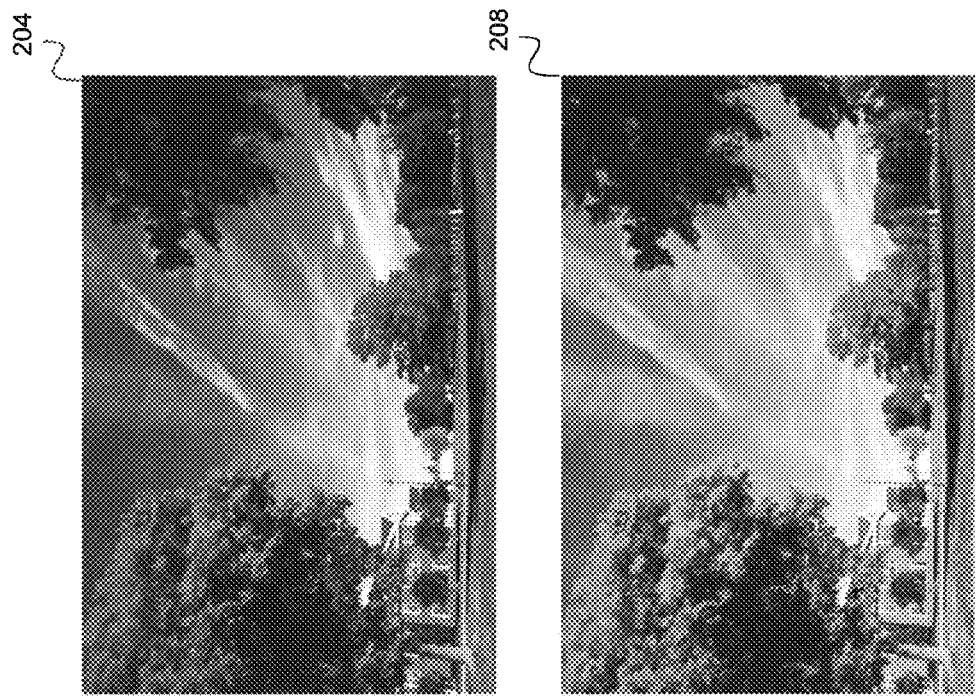
FIG. 2 illustrates transfer of color between color images, according to an embodiment.
Figure 2:
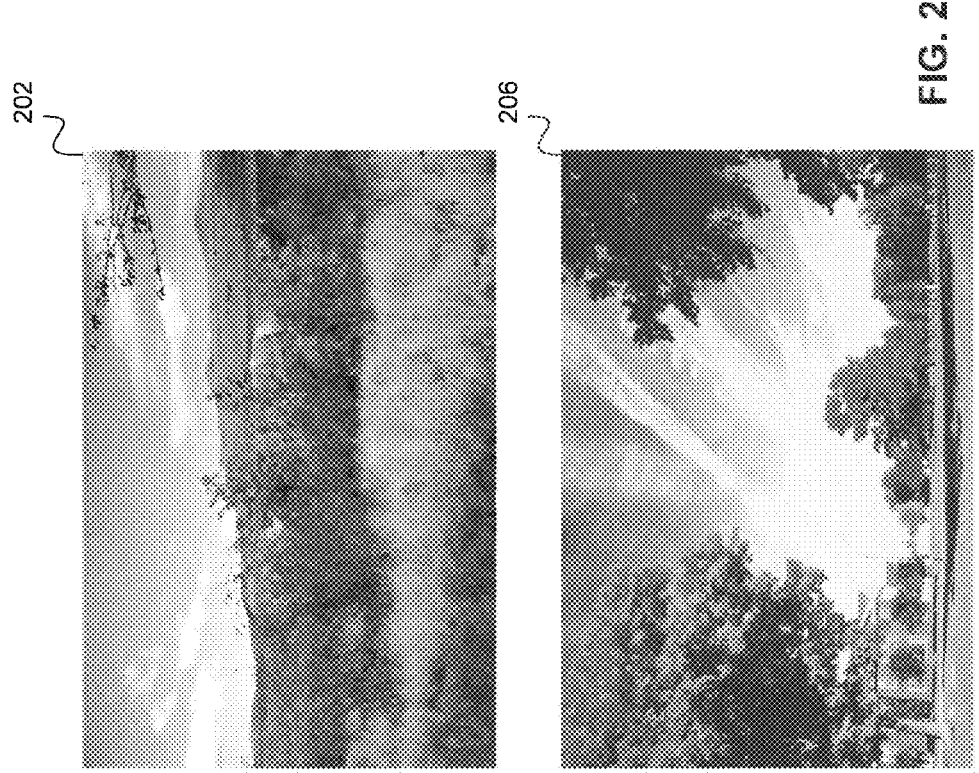

FIG. 2 illustrates transfer of color between color images, according to an embodiment. In the example of FIG. 2, image 202 is a reference image 104 and image 204 is a correctible image 102. It may be desirable, or a user may desire, to enhance or transfer color characteristics from image 202 to the image 204. A conventional approach to color correction, as referenced above, may include matching average and standard deviation of pixel colors in both images. The result of such a conventional approach may be seen in image 206. As seen in image 206, because the yellow plains are the dominant portion of image 202, the sky may turn a yellowish color, while the trees, though still red, may now have a yellowish hue.

Color correcting image 204 based on image 202 via the components of FIG. 1A as discussed above may result in a color-corrected image such as image 208. Matching the k-means colors of the images as guided by metric 122 yields a much more natural result 208, especially when compared with the conventional approach as may be seen in image 206.

Figure 3:
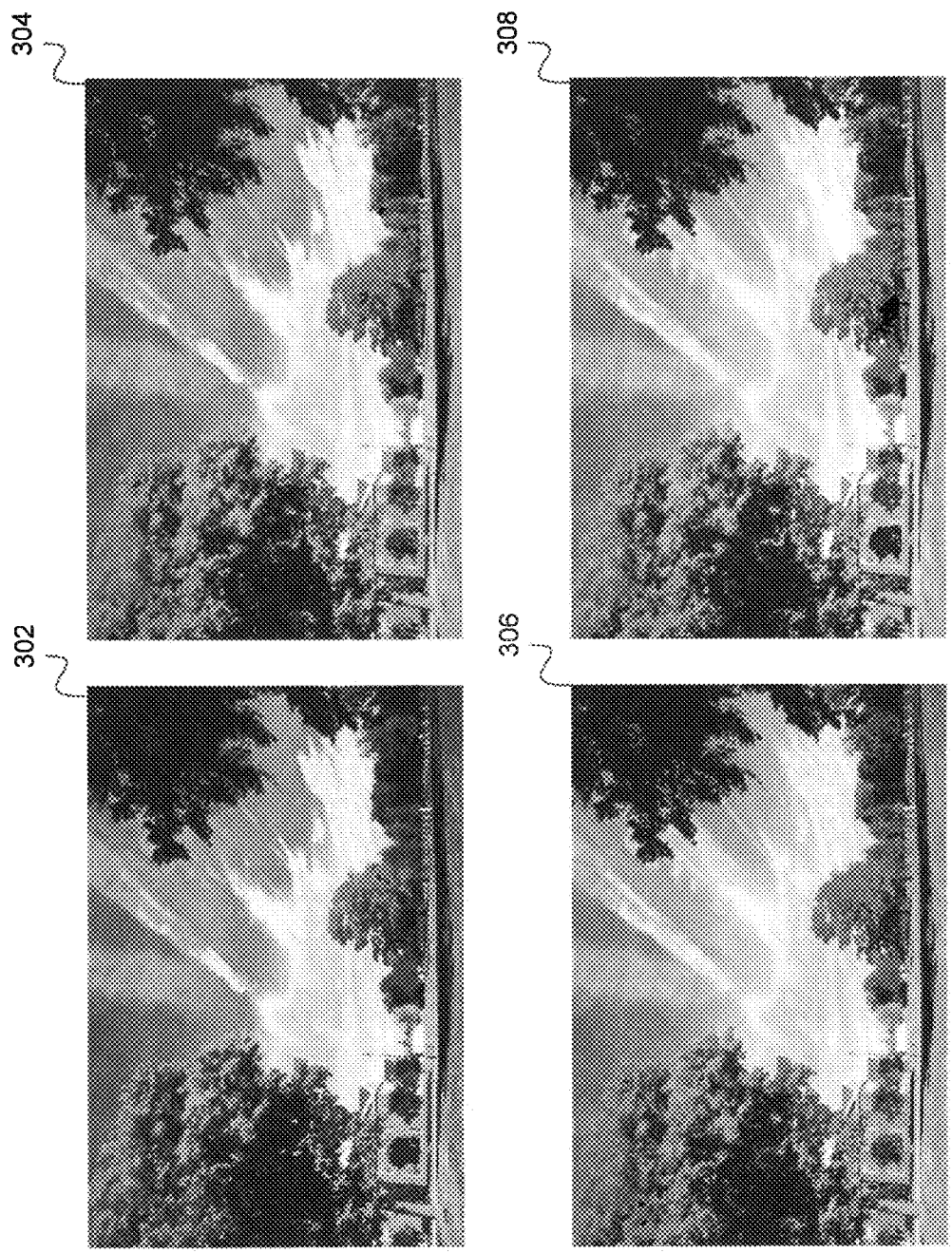
FIG. 3 illustrates color transfer attempts with incremental scores during optimization, according to an embodiment.

FIG. 3 illustrates color transfer attempts with incremental scores during optimization, according to an embodiment. In continuing the example of FIG. 2, where image 204 is to be enhanced or corrected based on image 202, the example of FIG. 3 shows exemplary intermediate attempts to correct the image 204 and increase metric 122 score. In the example of FIG. 3, image 302 may be the first attempt at color correcting, and successively, image 308 may be the final attempt where metric 122 score is highest.

Image 304 may have a higher metric 122 score than image 302, because for example, when viewing the images, it may be seen that much of the darkness surrounding the objects of image 302 are lightened in image 304. After optimizer 130 optimizes image 302, optimizer 130 may recursively or iteratively train 135 with classifier 120 to yield image 304, for which there is a significantly visible improvement over image 302 (and corresponding metric 122 score improvement).

Classifier 120 may then again recursively train 135 itself using images 304 and 302 as negative samples, and image 202 as a positive sample to yield the further color-corrected image 306. Repeating the process one more time may yield the color-corrected image 308, which may have the highest metric 122 score of the all images 302-306.

Figure 4:
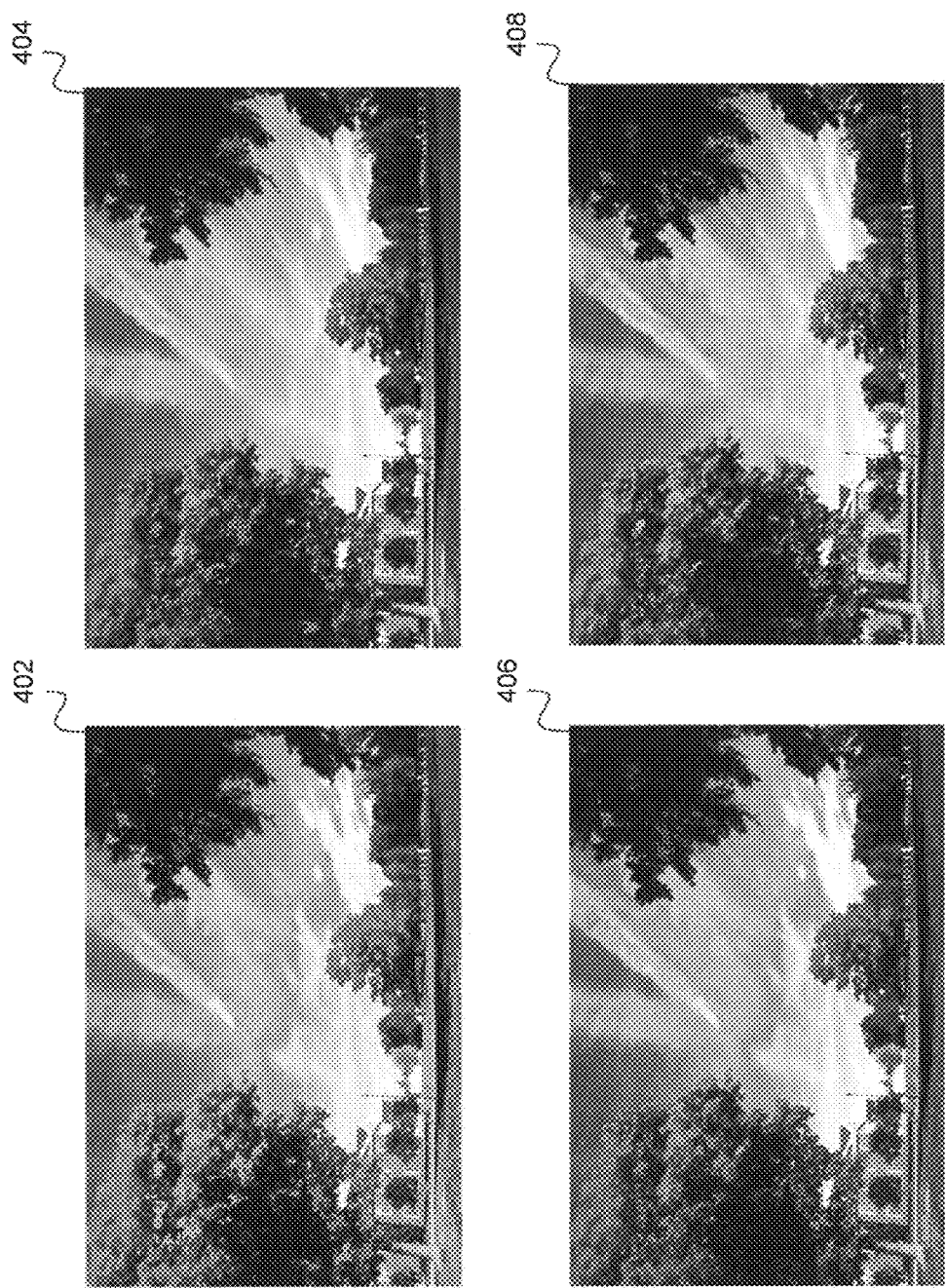
FIG. 4 illustrates variations from recursive training to image 208 of FIG. 2, according to an embodiment.

FIG. 4 illustrates variations from recursive training to image 108 of FIG. 1, according to an embodiment. As referenced above, each time optimizer 130 performs a recursive optimization on an image, a new color-corrected image associated with a new metric score may be produced. As such, images 402, 404, 406 and 408 of FIG. 4, show four example images that may be produced as a result of recursive training 135 by classifier 120. When viewed closely it may be seen that color differences between the images 402-408 exist in the sky and the trees as depicted by the images.

Figure 5:
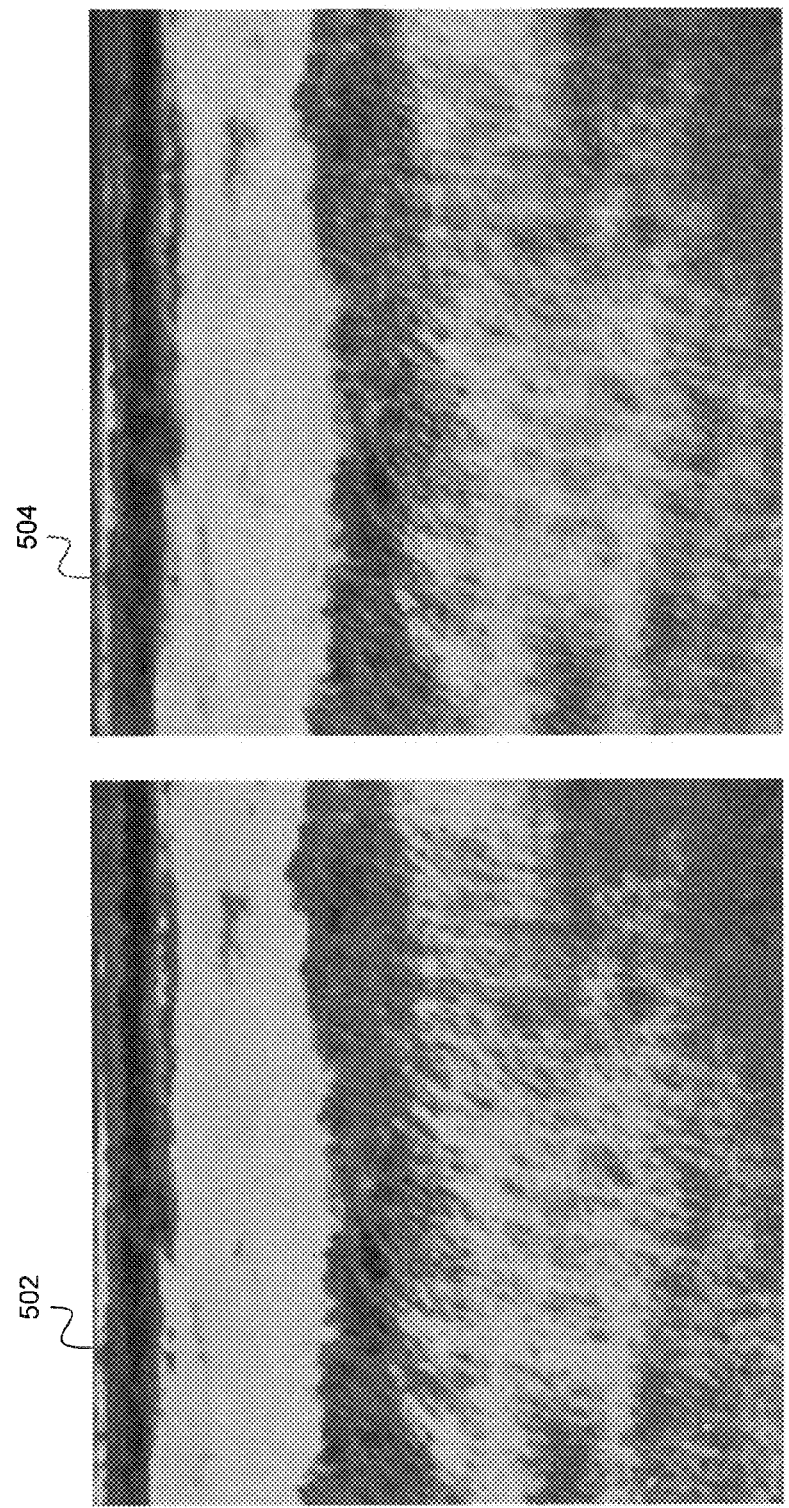
FIG. 5 illustrates an over-saturation effect on a color transferred correctible image and effects of Poisson image editing on the color transferred correctible image.

FIG. 5 illustrates an over-saturation effect on a color transferred correctible image and effects of Poisson image editing on the color transferred correctible image. Image 502 shows an example correctible image where there has been a color over-saturation on the grass, especially visible on the top-half of image 502. Image 504, by contrast, shows how image 502 may change if a gradient from an original (correctible) image is applied to optimize image 502. As may be seen in the corresponding grass, especially in the top-half of image 504, less color saturation is visible.

Figure 6:
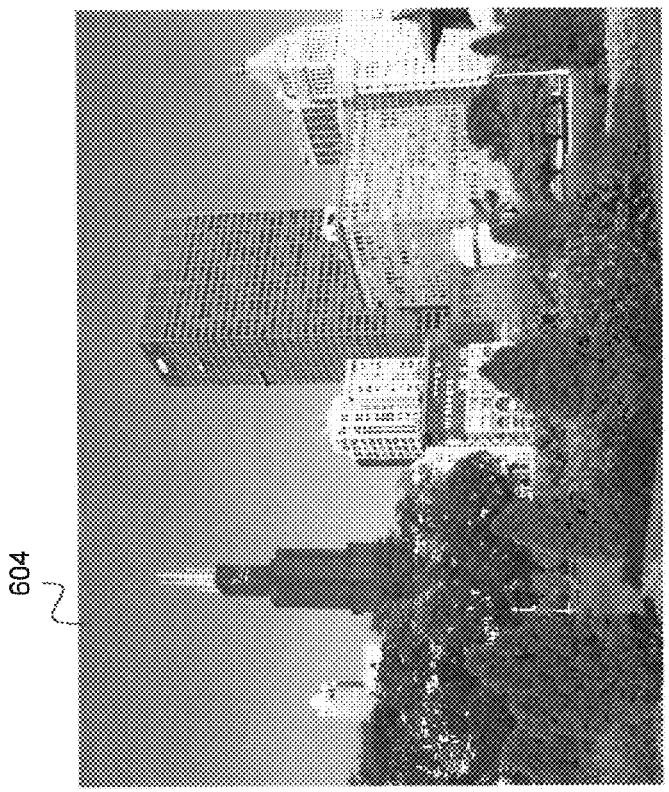
FIG. 6 illustrates exemplary reference images, according to an embodiment.
Figure 6:
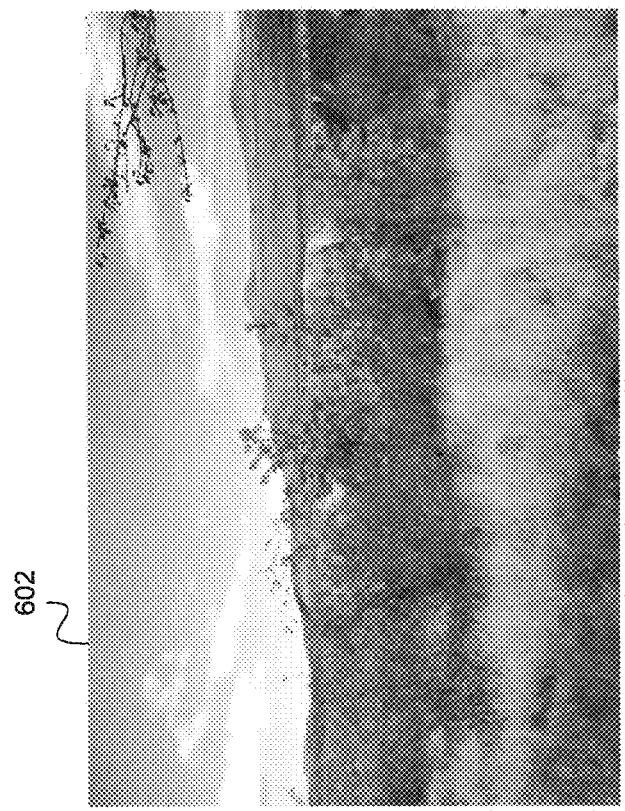

FIG. 6 illustrates exemplary reference images, according to an embodiment. Images 602 and 604 are example reference images 104 that may be used by the components of FIG. 1A. As may be seen, the vibrant colors in the images are good examples of how an image should look. It should be understood that images 602 and 604 are merely exemplary, and use are a reference image 104 is based on a user's preferences and/or goals.

Figure 7:
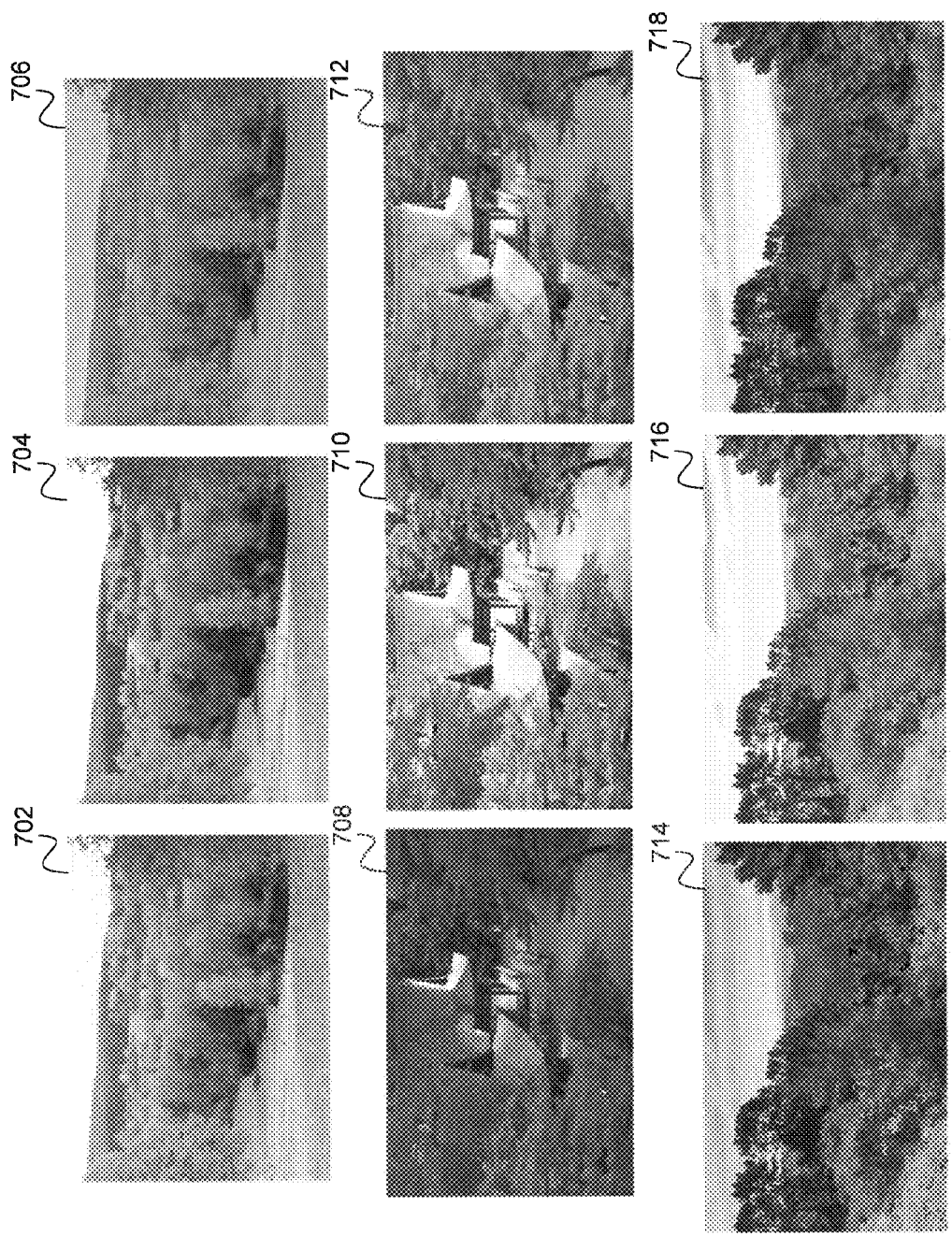
FIG. 7 includes exemplary color transfer results to image 602 of FIG. 6, according to an embodiment.

FIG. 7 includes exemplary color transfer results to image 602 of FIG. 6, according to an embodiment. FIG. 7 includes 3 columns of images. The first column of images 702, 708 and 714 includes original or correctible images 102 with correctible colors that are to be improved. The second column of images 704, 710 and 716 includes representations of the first column of images that have been color corrected using a conventional or average color and standard deviation technique. The third column of images 706, 712 and 718 includes representations of the first column of images that have been color corrected using the components of FIG. 1A. Images 706, 712 and 718 have been color corrected based on image 602 of FIG. 6.

Figure 8:
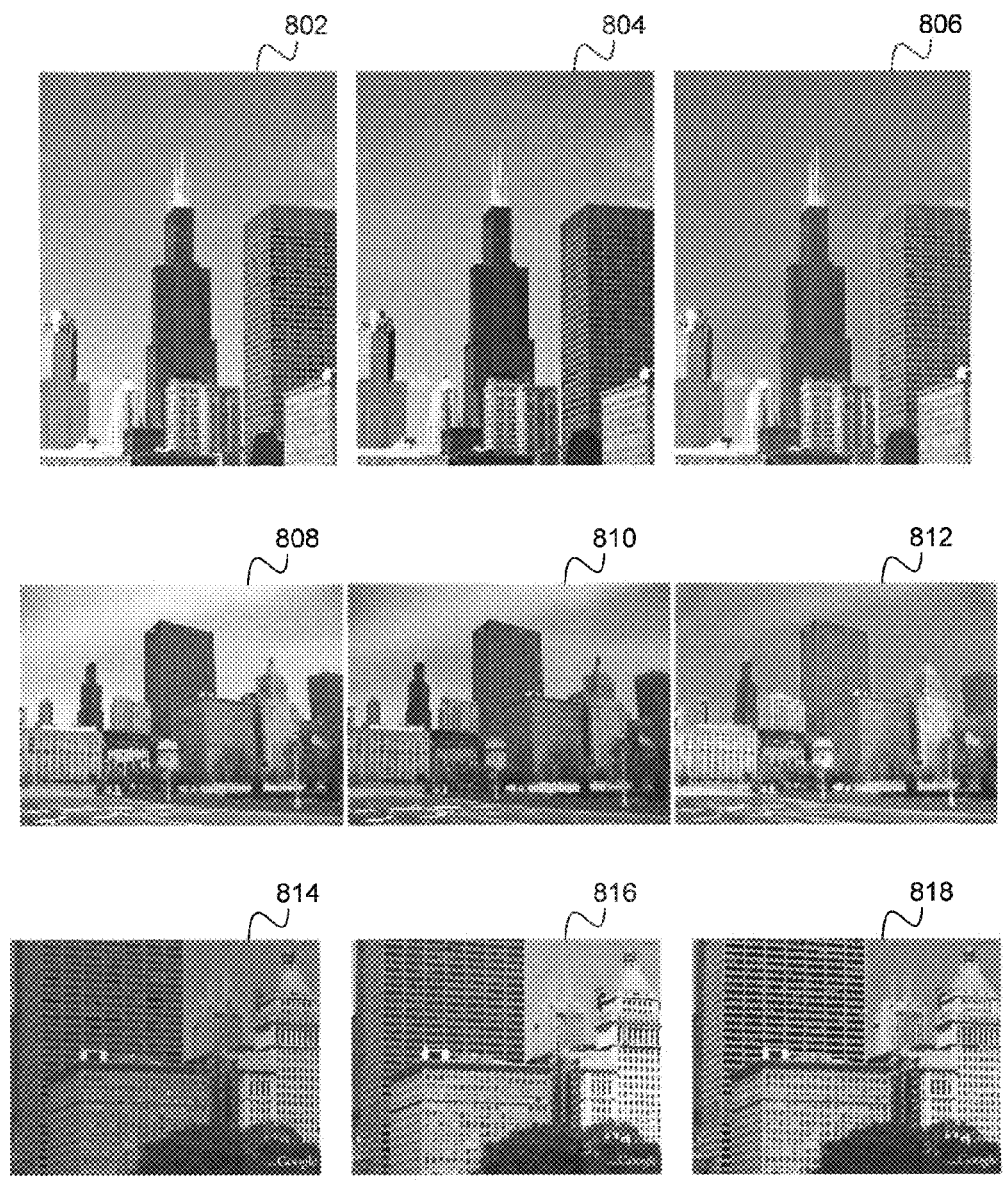
FIG. 8 includes exemplary color transfer results to image 604 of FIG. 6, according to an embodiment.

FIG. 8 includes exemplary color transfer results to image 604 of FIG. 6, according to an embodiment. FIG. 8 includes 3 columns of images. The first column of images 802, 808 and 814 includes original or correctible images 102, taken at the same geo-location as the image 604 of FIG. 6, with correctible colors that are to be improved. The second column of images 804, 810 and 816 includes representations of the first column of images that have been color corrected using a conventional or average color and standard deviation technique. The third column of images 806, 812 and 818 includes representations of the first column of images that have been color corrected using the components of FIG. 1A. Images 806, 812 and 818 have been color corrected based on the image 604 of FIG. 6.

Figure 9:
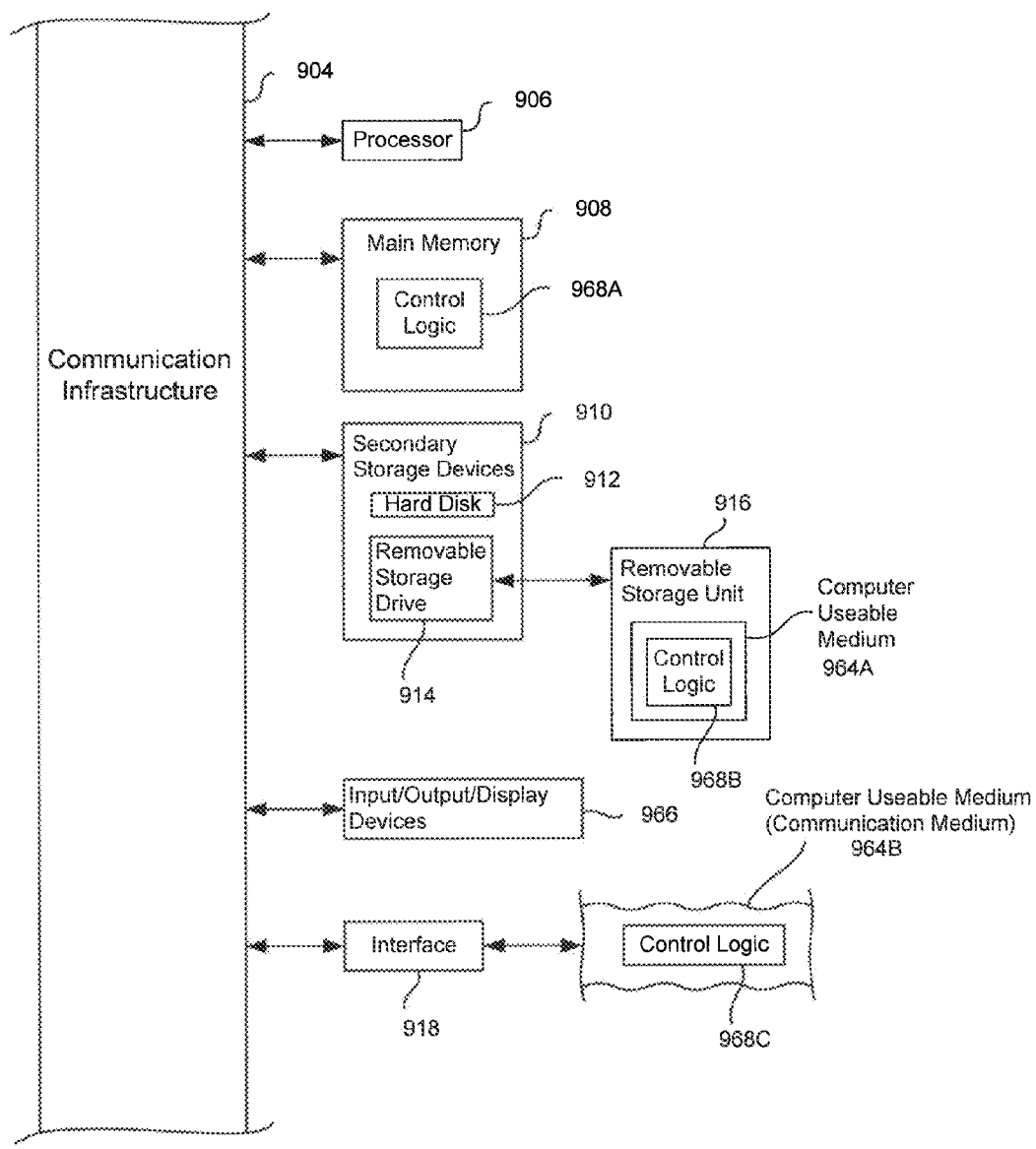
FIG. 9 illustrates an example computer device useful for implementing components of the embodiments.

FIG. 9 illustrates an example computer device useful for implementing components of the embodiments. For example, color candidate identifier 110, classifier 120, optimizer 130 and color transfer module 140 may be implemented using one or more computers, such as example computer 902 shown in FIG. 9.

Computer 902 can be any commercially available and well known computer capable of performing the functions described here, such as computers available from International Business Machines, Apple, Sun, HP, Dell, Compaq, Cray, etc. Computer 902 includes one or more processors (also called central processing units, or CPUs), such as a processor 906. Processor 906 is connected to a communication infrastructure 904.

Computer 902 may also include a main or primary memory 908, such as random access memory (RAM). Control logic 968A (computer software), and data may be stored in primary memory 908.

Computer 902 also includes one or more secondary storage devices 910. Secondary storage devices 910 include, for example, a hard disk drive 912 and/or a removable storage device or drive 914, as well as other types of storage devices, such as memory cards and memory sticks. Removable storage drive 914 represents a floppy disk drive, a magnetic tape drive, a compact disk drive, an optical storage device, tape backup, etc.

Removable storage drive 914 may interact with a removable storage unit 916. Removable storage unit 916 includes a computer useable or readable storage medium 964A. Computer software 968B (control logic) and/or data may be stored in computer useable or readable storage medium 964A. Removable storage unit 916 represents a floppy disk, magnetic tape, compact disk, DVD, optical storage disk, flash memory drive, or any other computer data storage device. Removable storage drive 914 reads from and/or writes to removable storage unit 916 in a well known manner.

Computer 902 also includes input/output/display devices 966, such as monitors, keyboards, pointing devices, Bluetooth devices, etc. Computer 902 further includes a communication or network interface 918. Network interface 918 enables computer 902 to communicate with remote devices. For example, network interface 918 allows computer 902 to communicate over communication networks or mediums 964B (representing a form of a computer readable medium), such as LANs, WANs, the Internet, etc. Network interface 918 may interface with remote sites or networks via wired or wireless connections. Control logic 968C may be transmitted to and from computer 902 via communication medium 964B.

Any tangible apparatus or article of manufacture that includes a computer useable or readable medium having control logic (software) stored in the apparatus or article of manufacture is referred to here as a computer program product or program storage device. This includes, but is not limited to, computer 902, main memory 908, secondary storage devices 910 and removable storage unit 916. Such computer program products, including control logic stored in the computer program products, when executed by one or more data processing devices, cause such data processing devices to operate as described here, represent the embodiments.

Embodiments described here may work with software, firmware, hardware, and/or operating device implementations other than those described here. Any software, hardware, and operating device implementations suitable for performing the functions described here can be used. Embodiments are applicable to both a client and to a server or a combination of both.

The Summary and Abstract sections may set forth one or more but not all exemplary embodiments as contemplated by the inventor(s), and thus, are not intended to limit the present embodiments and the appended claims in any way.

The present embodiments have been described above with the aid of functional building blocks illustrating the implementation of specified functions and relationships of the present embodiments. The boundaries of these functional building blocks have been arbitrarily defined here for the convenience of the description. Alternate boundaries can be defined so long as the specified functions and relationships of the functional building blocks are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented here. It is to be understood that the phrases or terms discussed here are for the purpose of description and not of limitation, such that the terms or phrases of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

What is claimed is:

1. A computer-implemented method for image color correction, comprising:
   identifying color candidates of mean color correspondences between a first image having desired color characteristics and a second image to which the desired color characteristics are to be applied;
   training a classifier to provide a metric that corresponds a degree of difference between the first image and the second image; and
   iteratively determining mean color correspondences between the first image and the second image using the metric as an objective function, and
   generating a color-corrected image having the desired color characteristics of the first image using the determined mean color correspondences,
   wherein the identifying, the training, the iteratively determining and the generating are performed using one or more processors.

2. The method of claim 1, the training further comprising:
   recursively re-training the classifier to obtain updated metrics that correspond to a degree of difference between the first image and one or more color-corrected candidates of the second image; and
   selecting a candidate image having the desired color characteristics after a pre-determined number of re-training recursions, the candidate image corresponding to a desired metric score.

3. The method of claim 2, further comprising:
   generating a transformation field in color space to transform one or more mean colors in the second image; and
   generating a corrected image having the desired color characteristics of the first image using the transformed colors.

4. The method of claim 2, wherein the training further comprises:
   providing a low metric score for color-corrected candidates of the second image determined to have color characteristics different from the first image; and
   providing a high metric score for color-corrected candidates of the second image determined to have color characteristics similar to the first image.

5. The method of claim 3, further comprising:
   measuring a color distance between two or more pairs of mean color correspondences between the first image and the selected candidate image;
   identifying a pair from said two or more pails contributing to noise in the corrected image; and
   removing the identified pair from said two or more pairs to reduce noise in the corrected image.

6. The method of claim 3, further comprising:
   applying one or more transformed colors to sparse pixel locations in the second image; and
   propagating other remaining transformed colors in the second image to preserve color gradients occurring in the second image.

7. The method of claim 1, wherein the training comprises:
   resolving the first image and the second image into a virtual pyramid of overlapping image patches; and
   down-sampling the image patches to determine features in each patch for the training of the classifier.

8. The method of claim 1, wherein the identifying comprises:
   identifying the color candidates using a second-order spectral correspondence method.

9. The method of claim 1, wherein the identifying further comprises:
   determining mean color values from the first image and the second image using a k-means algorithm.

10. The method of claim 1, wherein the identifying comprises:
    identifying a plurality of mean color values in the first image as color candidates to replace colors in the second image.

11. The method of claim 1, wherein the feature used for classifier training is a spatial pyramid matching kernel of LAB color space, where L represents color lightness and A and B represent color-opponent dimensions.

12. The method of claim 1, wherein the classifier is a support vector machine (SVM) classifier.

13. A processor-based system for image color correction, comprising:
    one or more processors;
    a color candidate identifier configured to identify color candidates of mean color correspondences between a first image having desired color characteristics and a second image to which the desired color characteristics are to be applied;
    a classifier configured to provide a metric that corresponds to a degree of difference between the first image and the second image;
    an optimizer configured to iteratively determine mean color correspondences between the first image and the second image using the metric as an objective function; and
    a color transfer module configured to generate a transformation field in color space to transform one or more mean colors in the second image and generate a color-corrected image having the desired color characteristics of the first image using the transformed colors,
    wherein the color candidate identifier, the classifier, the optimizer and the color transfer module are implemented using the one or more processors.

14. The system of claim 13, wherein the classifier and the optimizer are configured to operate recursively.

15. The system of claim 13, wherein the metric indicates a higher score when the correctible image corresponds closely with the reference image, and a lower score when the correctible image does not correspond closely with the reference image.

16. The system of claim 15, wherein the optimizer is configured to measure the metric during an iterative correction process performed by the classifier and the optimizer on one or more one or more color-corrected candidates of the second image.

17. The system of claim 16, wherein the color transfer module corrects colors in the second image based on colors in the first image, wherein the metric comprises a maximum metric score.

18. A non-transitory Computer readable storage medium having instructions stored thereon that, when executed by a computing device, cause the computing device to perform operations comprising:
    identifying color candidates of mean color correspondences between a first image having desired color characteristics and a second image to which the desired color characteristics are to be applied;

training a classifier to provide a metric that corresponds a degree of difference between the first image and the second image; and iteratively determining mean color correspondences between the first image and the second image using the metric as an objective function, and generating a color-corrected image having the desired color characteristics of the first image using the determined mean color correspondences.

19. The computer-readable storage medium of claim 18, the training further comprising:

recursively re-training the classifier to obtain updated metrics that correspond to a degree of difference between the first image and one or more color-corrected candidates of the second image; and selecting a candidate image having the desired color characteristics after a pre-determined number of re-training recursions, the candidate image corresponding to a desired metric score.

20. The computer-readable storage medium of claim 19, the operations further comprising:

generating a transformation field in color space to transform one or more mean colors in the second image; and generating a corrected image having the desired color characteristics of the first image using the transformed colors.

21. A computer-implemented method for generating a satellite image map, comprising:

obtaining a first image and a second image from one or more satellite imaging sources, wherein the first image has desired color characteristics and the second image in one to which the desired color characteristics are to be applied, and wherein the first image and the second image are partially overlapping images;

identifying color candidates of mean color correspondences between the first image and the second image;

training a classifier to provide a metric that corresponds a degree of difference between the first image and the second image;

iteratively determining mean color correspondences between the first image and the second image using the metric as an objective function;

generating a color-corrected image having the desired color characteristics of the first image using the determined mean color correspondences; and merging the partially overlapping first image and the second image to generate a satellite image map, wherein the obtaining, the identifying, the training, the iteratively determining, the generating and the merging are performed using one or more processors.

* * * * *

UNITED STATES PATENT AND TRADEMARK OFFICE
CERTIFICATE OF CORRECTION

| | | |
|---|---|---|
| PATENT NO. | : 8,913,827 B1 | Page 1 of 1 |
| APPLICATION NO. | : 13/104625 | |
| DATED | : December 16, 2014 | |
| INVENTOR(S) | : Hui Fang | |

It is certified that error appears in the above-identified patent and that said Letters Patent is hereby corrected as shown below:

Claims
Column 13, line 55, claim 5, delete "pails" and insert therefor --pairs--.

Signed and Sealed this
Second Day of February, 2016

Michelle K. Lee
*Director of the United States Patent and Trademark Office*